(12) United States Patent
Levin (10) Patent No.: US 7,545,704 B2
(45) Date of Patent: Jun. 9, 2009

(54) PERFORMING 3-D SCATTERER IMAGING FROM 2-D SEISMIC DATA

(75) Inventor: Stewart Arthur Levin, Centennial, CO (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 11/674,526

(22) Filed: Feb. 13, 2007

(65) Prior Publication Data
US 2008/0195321 A1 Aug. 14, 2008

(51) Int. Cl.
*G01V 1/34* (2006.01)
*G01V 1/30* (2006.01)

(52) U.S. Cl. .............................. 367/72; 367/53; 367/58
(58) Field of Classification Search .................. 367/53, 367/56, 58, 72
See application file for complete search history.

(56) References Cited

U.S. PATENT DOCUMENTS

| 4,866,659 | A | | 9/1989 | Lin et al. | |
|---|---|---|---|---|---|
| 5,260,911 | A | * | 11/1993 | Mason et al. | 367/57 |
| 5,394,151 | A | | 2/1995 | Knaell et al. | |
| 6,049,507 | A | * | 4/2000 | Allen | 367/21 |
| 6,088,295 | A | | 7/2000 | Altes | |
| 6,151,556 | A | * | 11/2000 | Allen | 702/18 |
| 6,553,315 | B2 | | 4/2003 | Kerekes et al. | |
| 6,584,409 | B2 | * | 6/2003 | Wisecup | 702/14 |
| 6,865,489 | B2 | * | 3/2005 | Jing | 702/16 |
| 7,085,195 | B2 | * | 8/2006 | Taner et al. | 367/50 |
| 2001/0047245 | A1 | | 11/2001 | Cheng et al. | |
| 2005/0088913 | A1 | * | 4/2005 | Lecomte | 367/51 |
| 2006/0015259 | A1 | * | 1/2006 | Gulunay | 702/14 |

FOREIGN PATENT DOCUMENTS

WO   WO 9115783 A1 * 10/1991

OTHER PUBLICATIONS

Milkereit et al. Multiattribute Processing of Seismic Data: Application to Dip Displays. Canadian Journal of Exploration Geophysics. vol. 26. Nos. 1&2. Dec. 1990. pp. 47-53.*

(Continued)

Primary Examiner—Jack W. Keith
Assistant Examiner—Scott A Hughes
(74) Attorney, Agent, or Firm—Meyertons Hood Kivlin Kowert & Goetzel, P.C.; Jeffrey C. Hood (57) ABSTRACT

A method for analyzing seismic data from a formation. The method may first receive two-dimensional (2-D) seismic data of a formation comprising a number of individual seismic lines acquired over an exploration area and having a large interline spacing. The 2-D seismic data may then be preprocessed to enhance diffracted energy. For each respective hypothetical diffractor location, the method may then search for coherent diffraction arrivals on nearby 2-D seismic lines consistent with the respective hypothetical diffractor location. The method may then store information regarding identified diffractor locations. The method may then create a map based on the identified diffractor locations, wherein the map illustrates areas of high diffraction. The map may then be displayed on a display, wherein the map is useable to assess the formation.

17 Claims, 7 Drawing Sheets

OTHER PUBLICATIONS

Keggin et al. Attenuation of multiple diffractions by multi-azimuth streamer acquistion. EAGE 64th Conference & Exhibition. Florence, Italy. May 27-30, 2002.*

Rastogi et al. Optimal aperture width selection and parallel implementation of Kirchoff Migration Algorithm. SPG 4th Conference & Expoosition on Petroleum Geophysics. Mumbai, India. Jan. 7-9, 2002.*

F. Steve Schilt, Sidney Kaufman, and George H. Long; "A Three-Dimensional Study of Seismic Diffraction Patterns from Deep Basement Structure"; Geophysics; Dec. 1981; pp. 1673-1683; vol. 46, No. 12.

T. J. Moser, E. Landa, and S. A. Petersen; "Velocity model based diffraction filtering"; SEG Extended Abstracts; 1999; 4 pages.

William S. Harlan, Jon F. Claerbout, and Fabio Rocca; "Signal/noise separation and velocity estimation" Geophysics; Nov. 1984; pp. 1869-1880; vol. 49, No. 11.

V. Khaidukov, E. Landa, and T. J. Moser; "Diffraction imaging by a focusing-defocusing approach"; SEG Expanded Abstracts 22, 1094; 2003; 4 pages.

Cohen, et al.; "Local discontinuity measures for 3-D seismic data"; Geophysics Journal; vol. 67, No. 6; Nov.-Dec. 2002; pp. 1933-1945.

International Search Report and Written Opinion for for application No. PCT/US2008/053808, mailed Nov. 27, 2008.

* cited by examiner

PERFORMING 3-D SCATTERER IMAGING FROM 2-D SEISMIC DATA

FIELD OF THE INVENTION

The present invention generally relates to seismic exploration, and more particularly to performing 3-D migration to image between coarsely spaced 2-D seismic data lines.

DESCRIPTION OF THE RELATED ART

Seismic exploration involves the study of underground formations and structures. In seismic exploration, one or more sources of seismic energy emit waves into a region of interest, such as a formation. These waves enter the formation and may be scattered, e.g., by reflection or refraction. One or more receivers sample or measure the reflected waves, and the resultant data are recorded. The recorded samples may be referred to as seismic data or "seismic traces". The seismic data contain information regarding the geological structure and properties of the region being explored. The seismic data may be analyzed to extract details of the structure and properties of the region of the earth being explored.

In general, the purpose of seismic exploration is to map or image a portion of the subsurface of the earth (a formation) by transmitting energy down into the ground and recording the "reflections" or "echoes" that return from the rock layers below. The energy transmitted into the formation is typically sound energy. The downward-propagating sound energy may originate from various sources, such as explosions or seismic vibrators on land, or air guns in marine environments. Seismic exploration typically uses one or more sources and typically a large number of sensors or detectors. The sensors that may be used to detect the returning seismic energy are usually geophones (used in land surveys) or hydrophones (used in marine surveys).

During seismic exploration (also called a seismic survey), the energy source may be positioned at one or more locations near the surface of the earth above a geologic structure or formation of interest. Each time the source is activated, the source generates a seismic signal that travels downward through the earth and is at least partially reflected. The seismic signals are partially reflected from discontinuities of various types in the subsurface, including reflections from "rock layer" boundaries. In general, a partial reflection of the seismic signals may occur each place there is a change in the elastic properties of the subsurface materials. The reflected seismic signals are transmitted upwards towards the surface of the earth. The reflected seismic signals that arrive at the surface are recorded typically at a number of locations at or near the surface. The recorded returning signals are digitized and recorded as a function of time (each data point comprises a signal amplitude and a corresponding signal acquisition time).

Seismic data are the result of recording the acoustic energy that has been reflected from discontinuities in the subsurface. The digital samples that make up the recording are usually acquired at equal intervals in time. In addition, each sample in a conventional digital seismic trace is associated with a travel time. Where the source and receiver are both located on the surface, the samples of reflected energy have a two-way travel time from the source to the reflector and back to the surface again.

In general, the surface location of every trace in a seismic survey is tracked and is made a part of the trace itself (as part of the trace header information). This allows the seismic information contained within the traces to be later correlated with specific surface and subsurface locations, thereby providing a means for posting and contouring seismic data—(and attributes extracted therefrom) on a map (i.e., "mapping").

Multiple source activation/recording combinations may be combined to create a near continuous profile of the subsurface that can extend over a large area. In a two-dimensional (2-D) seismic survey, the recording locations are generally laid out along a single line or track, a "2-D seismic line or profile". In a three-dimensional (3-D) survey the recording locations are typically distributed across the surface in a specified pattern. In a "raw" or "preprocessed" form, a "pre-stack" seismic trace will exist for every pair of source and receiver locations. The general goal of seismic processing is to transform the acquired seismic data into a form that is useful for some aspect of seismic interpretation such as, but not limited to, structural and/or stratigraphic inference of the subsurface geology, lithology and/or fluid estimation for potential subsurface hydrocarbon reservoirs, and more. Seismic processing techniques and seismic data organization will generally depend upon the final interpretation objectives, the quality of the seismic data, the complexity of the subsurface, and many other factors.

Seismic data that have been properly acquired and processed can provide a wealth of information to the explorationists (individuals within an oil company whose job it is to identify potential drilling sites). For example, a seismic profile gives an explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of the seismic survey data, estimates of subsurface rock discontinuities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Prior to the mid 1980s, most seismic data acquisition was two-dimensional (2-D), comprising a number of individual seismic lines acquired in some coarse pattern over the exploration area. From interpretation of these data, three-dimensional (3-D) structural maps were generated to help evaluate the prospect. Subsequently, widespread acceptance of finely-sampled 3-D seismic acquisition methods relegated 2-D projects to a small percentage of new data acquisition, with most 2-D work comprising the reprocessing of pre-existing 2-D data grids.

In the last few years, 2-D data acquisition has seen a resurgence in the form of huge regional 2-D seismic grids, such as the GulfSpan project which covers much of the northern Gulf of Mexico. Such acquisition is designed to provide a regional framework. However, this acquisition has interline spacing measured in kilometers, and thus is not generally suited to 3-D seismic migration imaging. The reason that 3-D migration fails is that it sweeps each given 2-D line sideways and upwards along approximately circular arcs into the spaces between the lines. This creates highly-aliased phantom structure within the gaps. (In theory, any or all of the locations along the arc could be the true image of the seismic line energy. In practice, it is often assumed with scant justification to be directly below the line itself.)

The consequence of the inability of 3-D migration to reliably image between coarsely-spaced 2-D lines is that interpretation of the interline gaps must be based on what can be correlated between adjacent (or intersecting) 2-D lines. Essentially either a smooth surface can be drawn connecting correlated reflectors between the lines or, where such a correlation cannot be made, it can only be inferred that there is some unknown structure within the gap that disrupts or terminates reflectors. This does not provide reliable knowledge about unpredictable structure between the lines, precisely the information that dense 3-D acquisition and imaging provides. Indeed, this is why, despite the high relative cost, 3-D has repeatedly proven a valuable investment. Commonly, such unpredictable structures form the flow barriers sealing hydrocarbons into reservoirs.

Therefore, it would be desirable to provide a way to detect and locate such "unpredictable" structures directly from the 2-D seismic data grid. Such a capability would provide multiple benefits. Infill acquisition to obtain dense 3-D coverage can be more intelligently targeted at areas where structural complexity has been determined. Vintage 2-D grids over producing reservoirs can be reprocessed to better understand flow barrier geometries and production history. Also, higher confidence can be placed on 2-D line correlations and associated reservoir volumetric estimates when there is little or no unpredictable structure between the lines.

SUMMARY OF THE INVENTION

Various embodiments are described of a system and method for analyzing seismic data from a formation.

The method may first receive two-dimensional (2-D) seismic data of a formation, wherein the seismic data comprises a plurality of 2-D seismic lines. The 2-D seismic energy may comprise a number of individual seismic lines acquired over an exploration area and may have a large interline spacing.

The 2-D seismic data may then be preprocessed to enhance diffracted energy. This may involve performing dip/velocity filtering to enhance steep linear arrivals (tails) characteristic of diffraction arrivals.

For each respective member of a plurality of hypothesized diffractor locations, the method may then search for coherent diffraction arrivals on nearby 2-D seismic lines consistent with the 3-D seismic response of the respective hypothetical diffractor location. The search may comprise searching for coherent diffraction arrivals on at least a predetermined subset, or all, of the seismic lines consistent with the hypothetical diffractor location.

In one embodiment, searching for coherent diffraction arrivals may comprise computing a measure of coherence along predicted trajectories associated with the respective hypothetical diffractor location. In another embodiment, the searching may comprise first computing a summation over a presumed curve with the 2-D seismic data, followed by computing a summation over the presumed curve a second time with a randomized version of the 2-D seismic data, and then performing a comparison of the relative amplitudes of the two calculations to automatically select coherent diffraction arrivals. In yet another embodiment, the searching may comprise computing a simple weighted summation along possible diffraction surfaces on the 2-D seismic lines, thereby producing a relative strength estimate.

The method may then store information regarding a first one or more respective hypothetical diffractor locations which have been identified to have coherent diffraction arrivals on nearby 2-D seismic lines consistent with the respective hypothetical diffractor location. The method may then create a map related to an underground volume, based on the identified diffractor locations, wherein areas of high diffraction may be highlighted. The map may then be displayed on a display such as a computer screen or paper plot, and may be usable by an explorationist to assess the geometry and geological nature of the scattering formations.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to".

DETAILED DESCRIPTION OF THE EMBODIMENTS

Figure 1:
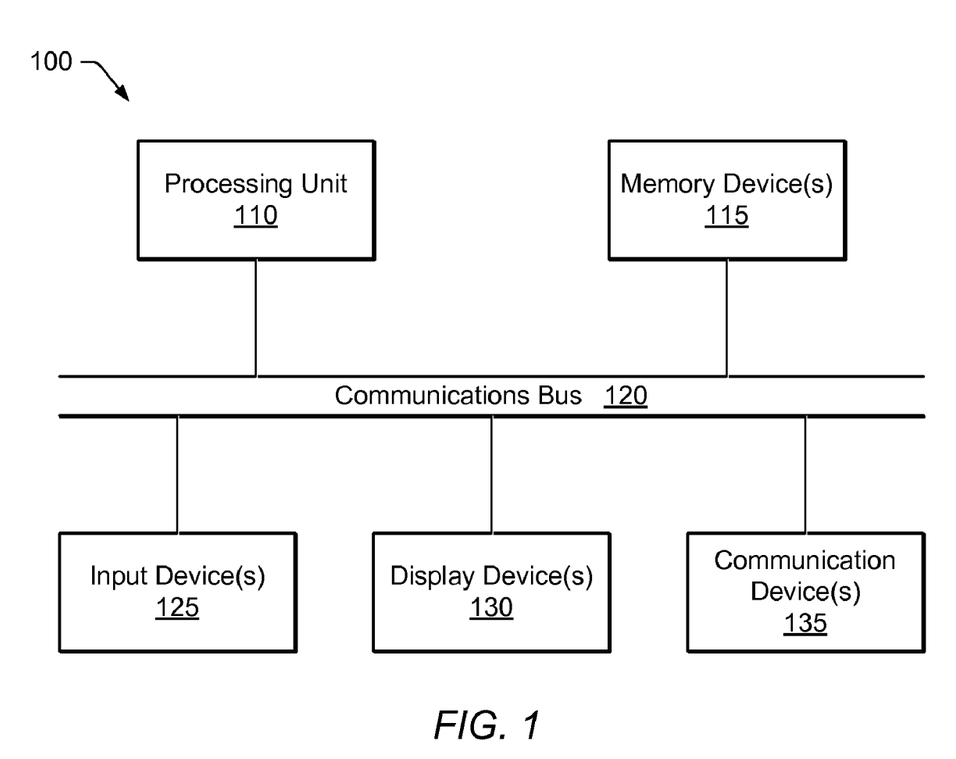
FIG. 1 illustrates one embodiment of a system 100 for analyzing seismic data.

FIG. 1—Computer-Based Analysis System

FIG. 1 illustrates a system 100 (such as a computer system) for analyzing seismic data according to one set of embodiments of the invention. System 100 may include a processing unit 110, a collection of memory devices 115, a communication bus 120, a set of input devices 125, and one or more display devices 130. The collection of memory devices 115 may include any of various forms of memory media and memory access devices. For example, memory devices 115 may include semiconductor RAM and ROM devices as well as mass storage devices such as CD-ROM drives, magnetic disk drives, magnetic tape drives, storage area networks (SANs), etc.

Processing unit 110 is configured to read and execute program instructions, e.g., program instructions provided on a memory medium such as a set of one or more CD-ROMs, and loaded into semiconductor memory at execution time. Processing unit 110 may couple to memory devices 115 through communication bus 120 (or through a collection of busses). In response to the program instructions, processing unit 110 may operate on seismic data stored in one or more of the memory devices 115. Processing unit 110 may include one or more programmable processors (e.g., microprocessors).

One or more users may supply input to the system 100 through the set of input devices 125. Input devices 125 may include devices such as keyboards, mouse devices, digitizing pads, track balls, light pens, data gloves, eye orientation sensors, head orientation sensors, etc. The set of display devices 130 may include devices such as monitors, projectors, head-mounted displays, printers, plotters, etc.

In one embodiment, system 100 may include one or more communication devices 135, e.g., a network interface card for interfacing with a computer network. For example, seismic data gathered at a remote site may be transmitted to the system 100 through a computer network. The system 100 may receive the seismic data from the computer network using the network interface card. In other embodiments, the system 100 may include a plurality of computers and/or other components coupled over the computer network, where storage and/or computation implementing embodiments of the present invention may be distributed over the computers (and/or components) as desired.

In one embodiment of the invention, the system 100 stores software (program instructions and/or data structures) for determining seismic information based on 2-D seismic grids. More particularly, the software may be executable to detect and locate underground structures that would correlate with the seismic data of the 2-D seismic grids.

Figure 2:
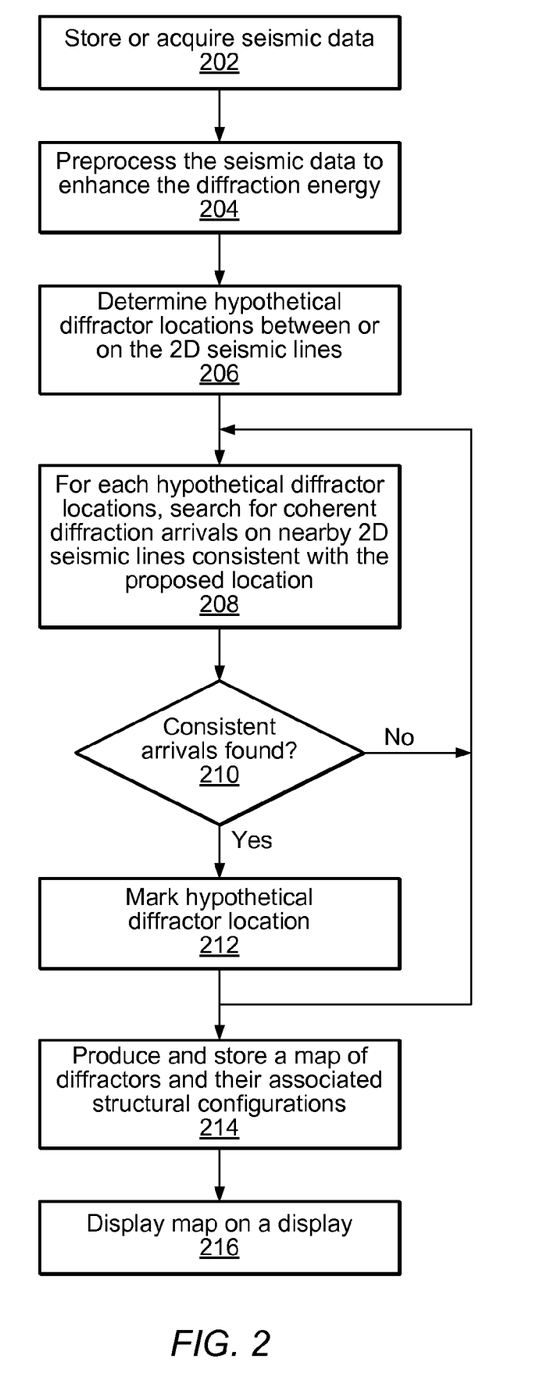
FIG. 2 is a flowchart diagram illustrating a method for analyzing seismic data according to one embodiment of the invention.

FIG. 2—Flowchart Diagram

FIG. 2 is a flowchart diagram illustrating one embodiment of the invention. The flowchart may be embodied in a software program that is executed by a computer system, e.g., the software program may be stored in memory 115 of system 100 and may be executed by processor 110.

Figure 3A:
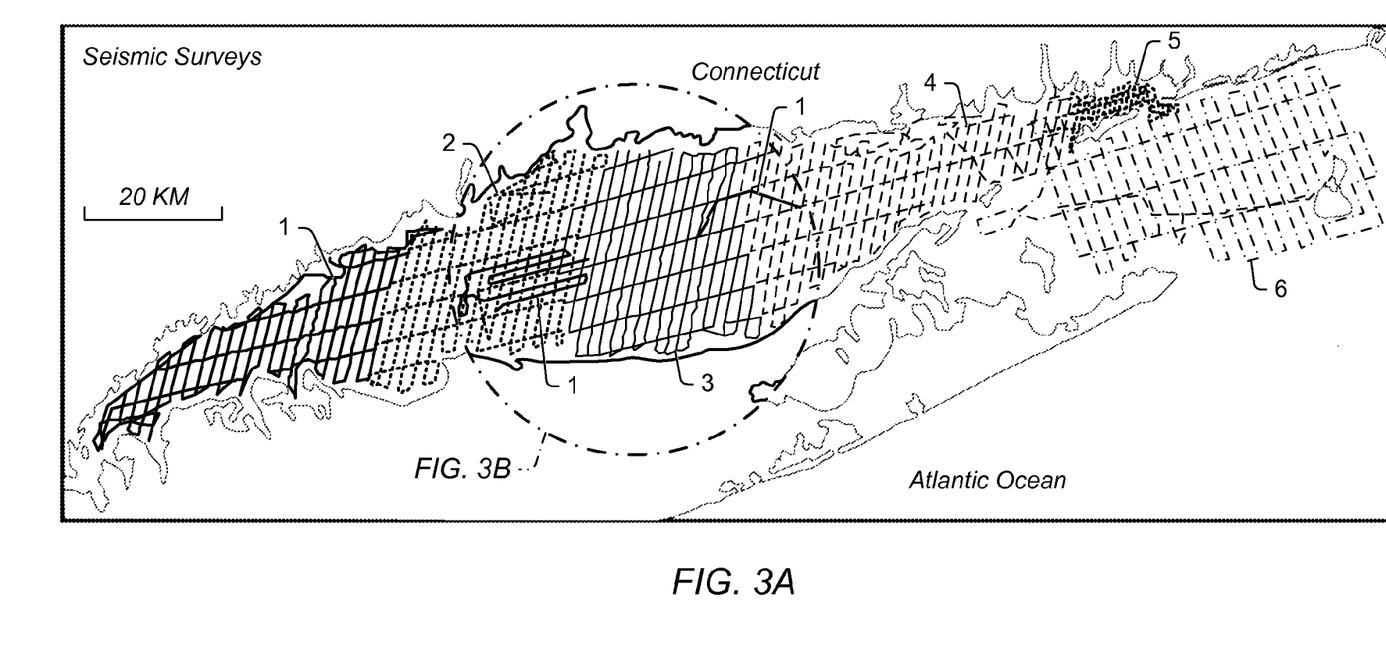
FIG. 3A presents a diagram of six overlapping seismic surveys taken in Long Island Sound.
Figure 3B:
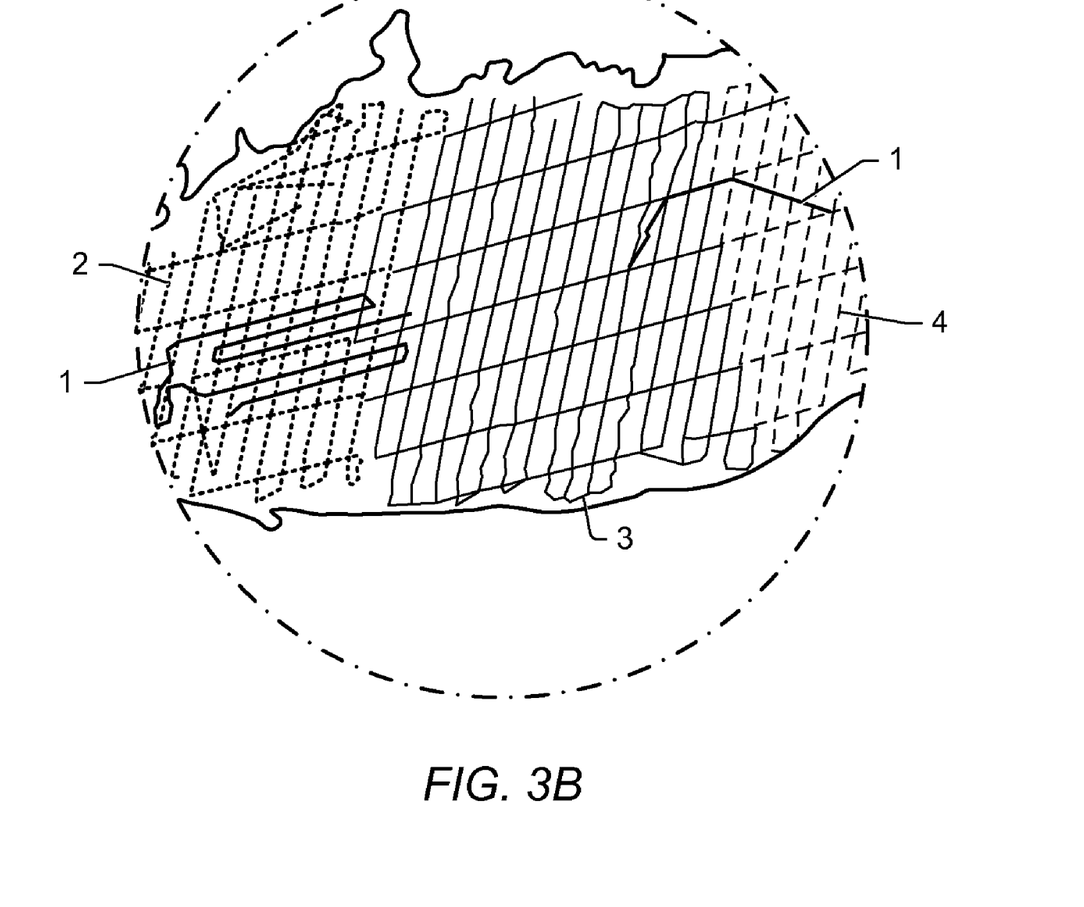
FIG. 3B presents an expanded portion of FIG. 3A that includes a plurality of crisscrossing seismic lines from seismic surveys 1, 2, 3, and 4.

In 202, seismic data (preferably 2-D seismic data) is stored in memory and/or acquired. For example, the seismic data may be stored in memory 115 of system 100. The seismic data may be 2-D seismic data, and may comprise a number of individual seismic lines acquired over an exploration area, e.g., a number of individual seismic lines acquired in a coarse pattern over the exploration area. In one embodiment, the 2-D seismic data has a sufficiently large interline spacing such that the seismic data are not amenable to 3-D seismic migration imaging. The term "large interline spacing" refers to a spacing between lines of approximately two hundred meters or more. In a first example, the 2-D seismic data may have an interline spacing (spacing between lines) on the order of one or more kilometers. In a second example, the 2-D seismic data may comprise a number of seismic lines acquired at different times and along different orientations forming an irregular crisscrossing pattern of tracks. In this second example, line spacing may vary from zero (where two seismic lines have a crossing point) to one or more kilometers at points well separated from the crossing points. FIG. 3A presents a diagram of six overlapping seismic surveys taken in Long Island Sound. FIG. 3B presents an expanded portion of FIG. 3A that illustrates a plurality of crisscrossing seismic lines from seismic surveys 1, 2, 3, and 4.

In 204, the method preprocesses the seismic data to enhance the diffracted energy. In 204 any of various preprocessing methods or techniques may be used for enhancing diffracted energy. In one embodiment, the method in 204 may comprise simple dip/velocity filtering to enhance the steep tails characteristic of diffraction arrivals. One embodiment of the method performed in 204 is described in Moser, Landa and Peterson, *Velocity model based diffraction filtering* (SEG Extended Abstracts, 1999), which is hereby incorporated by reference as though fully and completely set forth herein. Another embodiment of the method performed in 204 may comprise more sophisticated focusing/defocusing transformations. One example of this technique is described in Harlan, Claerbout and Rocca, *Signal/noise separation and velocity estimation* (Geophysics, 49(11), 1984) or Khaidukov, Landa and Moser, *Diffraction imaging by a focusing-defocusing approach* (SEG Extended Abstracts, 2003), which are hereby incorporated by reference as though fully and completely set forth herein.

Figure 4A:
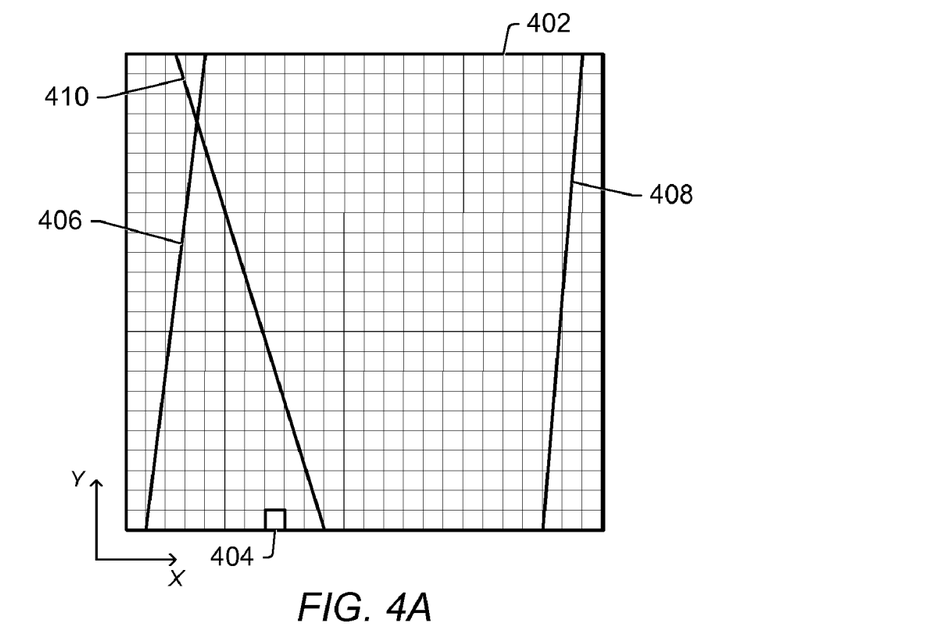
FIG. 4A presents a top view of an exemplary 3-D array 402 of cells that includes a seismic line 408 and crossing seismic lines 406 and 410.
Figure 4B:
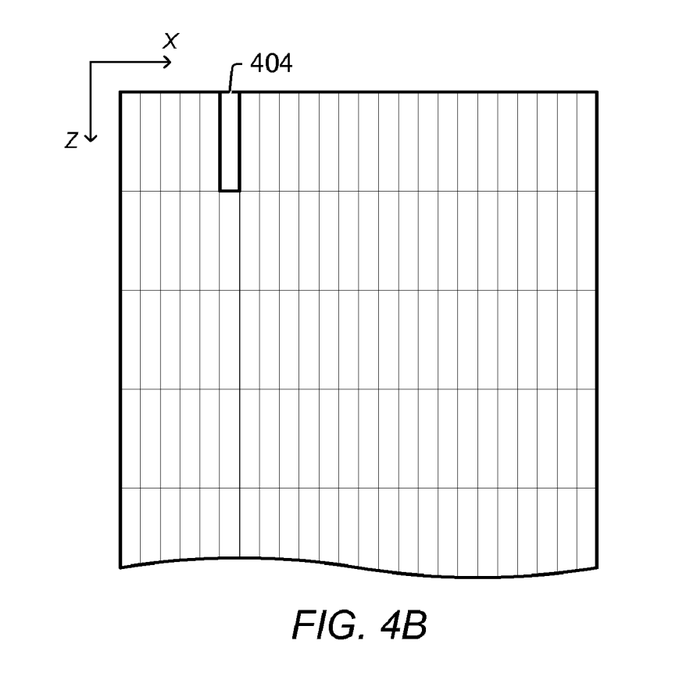
FIG. 4B presents an underground side view of the exemplary 3-D array 402.
Figure 4C:
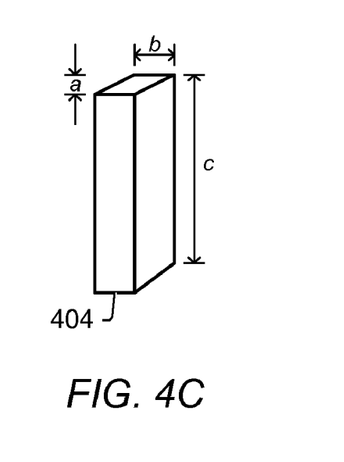
FIG. 4C presents a perspective view of an exemplary cell.

In 206, the method may determine hypothetical diffraction locations between or on the 2-D seismic lines. The hypothetical diffractor locations may initially be determined by placing a 3-D array of closely-spaced cells (e.g., 25 m×25 m×25 m in size) to span the underground volume and include one or more 2-D seismic lines, and selecting one or more points within each cell as candidate diffractor locations. FIG. 4A presents a top view of an exemplary 3-D array 402 of cells that includes a seismic line 408 and crossing seismic lines 406 and 410. FIG. 4B presents an underground side view of the exemplary 3-D array 402. Various cell dimensions and/or shapes may be used, as desired. FIG. 4C presents a perspective view of an exemplary cell 404 as a rectangular solid with dimensions a, b, and c. In other embodiments, N hypothetical diffractor locations may be randomly selected within the underground volume (where N is a positive integer selected to provide a desired average separation between hypothetical diffractor locations). In still other embodiments, the cell shape and/or size may be varied or be irregular within the underground volume to provide a greater density of hypothetical diffractor locations in portions of the volume where a geologist may expect to find diffractor locations and a lesser density in other portions of the underground volume.

For each hypothetical diffractor location, the method may perform 208, 210, and 212. In 208, for a respective hypothetical diffractor location, the method may search the available seismic data for coherent diffraction arrivals on nearby 2-D seismic lines consistent with the hypothetical diffractor location (proposed location). In one embodiment, the method in 208 searches for coherent diffraction arrivals on all nearby 2-D seismic lines consistent with the hypothetical diffractor location. In another embodiment, the method in 208 searches for coherent diffraction arrivals on at least a predetermined percentage of nearby 2-D seismic lines, such as greater than 75%, 80%, 85%, 90% or 95%, or other suitable criteria.

The method in 208 may comprise automatically correlating diffracted arrivals in multiple 2-D lines. The technique in 208 can be performed in various manners. In one embodiment, semblance (which is often used in conventional velocity analysis) or other measures of coherence can be computed along predicted trajectories associated with a potential diffracting point. Standard exploration geophysics definitions and formulas for coherence and semblance may be employed for this calculation. For example, the method may use standard exploration geophysics definitions and formulas for coherence and semblance from R. E. Sheriff's *Encylopedic Dictionary of Exploration Geophysics* published by the Society of Exploration Geophysics, which is hereby incorporated by reference as though fully and completely set forth herein. This provides a likelihood measure of the presence of a diffractor at that location.

In another embodiment, in 208 the method may, following the above cited approach of Harlan, Claerbout and Rocca, first compute a summation over the presumed diffraction arrival path with the actual 2-D data and then may compute a summation over the same presumed path a second time with a randomized version of the actual 2-D data. The method may then perform a comparison of the relative amplitudes of the two calculations to automatically select likely diffractor locations.

In another embodiment, in 208 the method may compute a simple weighted summation along each proposed diffraction surface to directly focus the diffraction, producing a relative strength estimate at the same time. The weights may be chosen to emphasize the nearly linear tails often characteristic of the diffraction surface in the 2-D seismic data. Alternatively the weights may be chosen according to migration imaging theory in order to produce a diffraction strength estimate that is linearly related to the true subsurface diffraction strength.

The operation performed in 208 can be considered as the opposite of earthquake epicenter location, which involves first identifying correlated arrivals at multiple locations and then back solves to determine the epicenter. Instead, the method described herein essentially examines possible epicenters (e.g., all or a subset of possible epicenters) and then determines if there are properly correlated arrivals at each sensor station (or a substantial majority of the sensor stations).

Figure 5:
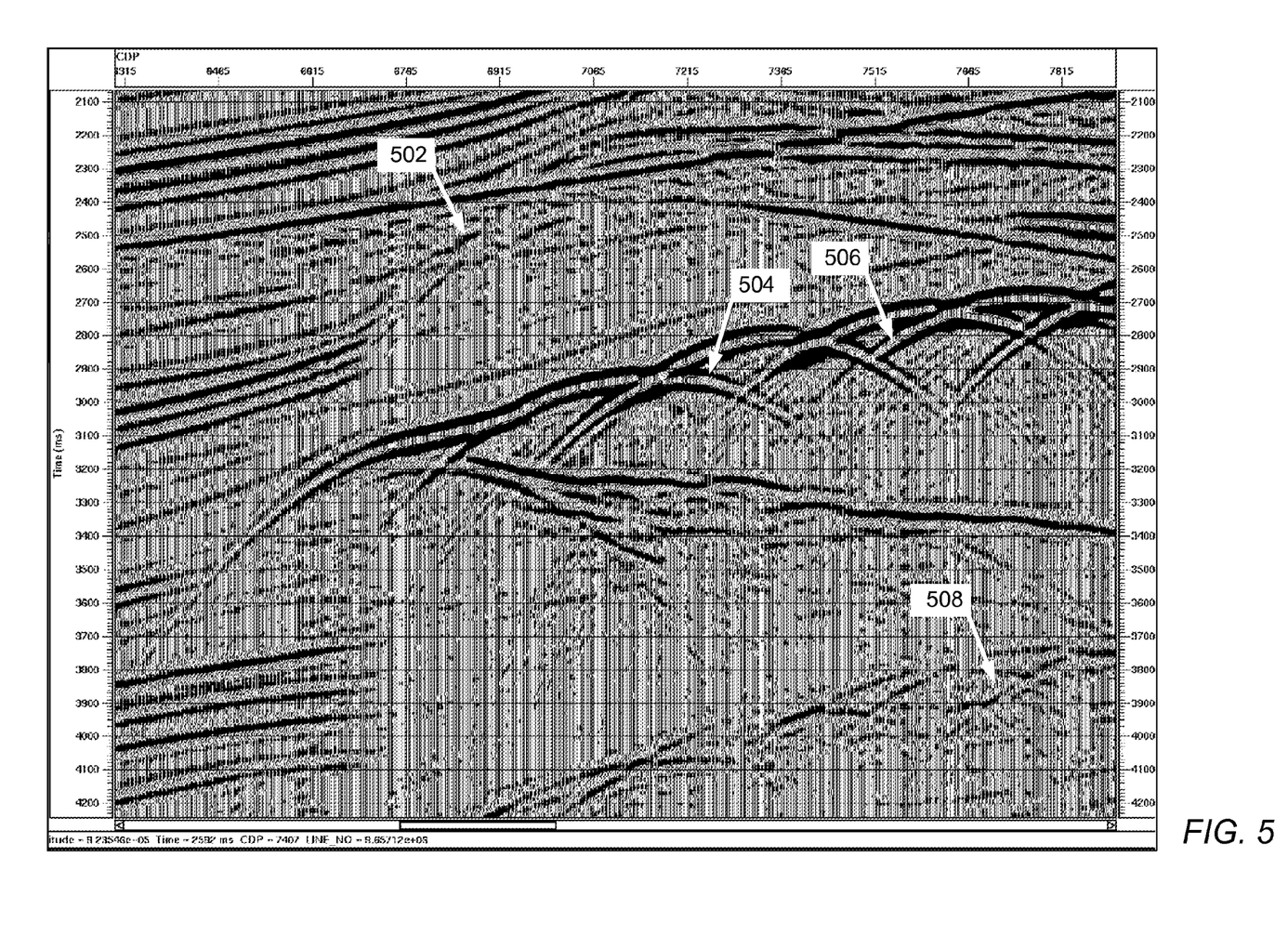
FIG. 5 shows a synthetic seismogram section showing hyperbolic diffractions 504 and 506 and linear diffraction tails 502 and 508 from diffractors located nearby the seismogram section.

FIG. 5 shows a synthetic seismogram section showing hyperbolic diffractions 504 and 506 and linear diffraction tails 502 and 508 from diffractors located nearby the seismogram section.

In 210, the method determines if consistent arrivals were found for the respective hypothetical diffractor location. If so, then in 212 the hypothetical diffractor location may be marked or information may be otherwise stored to indicate that this respective hypothetical diffractor location is in fact a diffractor location.

Figure 6:
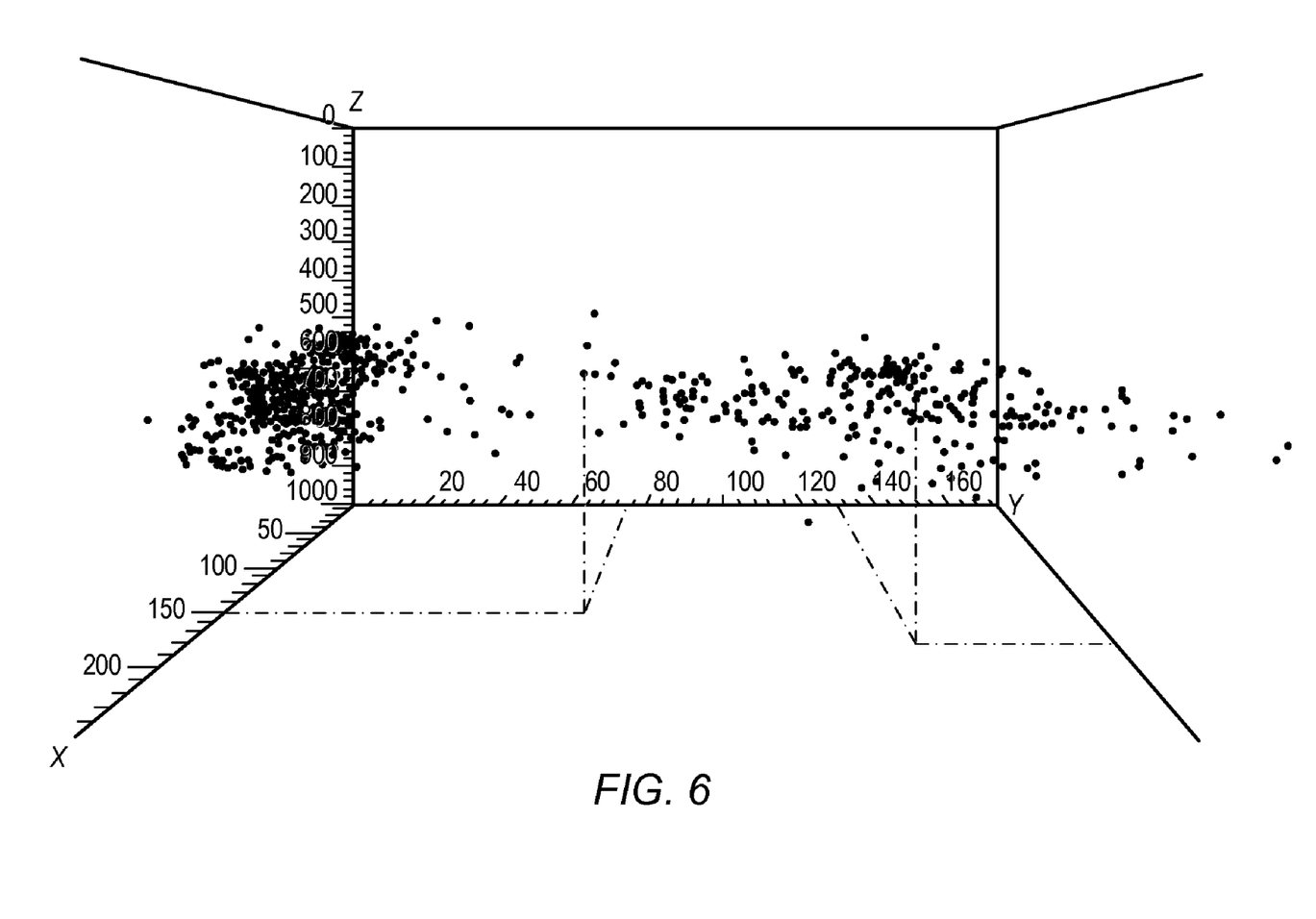
FIG. 6 provides an exemplary 3-D image of identified diffractor locations.

Steps 208, 210, and 212 are performed for each of the respective hypothetical diffractor locations that were identified in 206. Thus the diffractor presence or absence estimate may be performed for each location of interest. After all of the hypothetical diffractor locations have been examined in 208, and those with coherent diffraction arrivals have been marked in 212, then in 214 the method may produce and store a map of diffractions and their associated structural configurations. The method may automatically iterate over a dense grid of locations, thus producing a map of diffractors and thereby their associated structural configurations. In some embodiments, the method may produce and store a 3-D image of diffractors. FIG. 6 provides an exemplary 3-D image of identified diffractor locations.

The method described herein may also be performed a number of times using different grids (or cell arrays), and thus using different sets of hypothesized diffraction locations in each iteration. In one embodiment, the method may utilize a "coarse to fine" approach, whereby a coarse grid (e.g., 50 m×50 m×50 m) may be used to determine hypothetical diffraction locations, followed by one or more iterations of finer grids (e.g., 25 m×25 m×25 m or 10 m×10 m×10 m) at possible locations of diffraction identified in the coarse iteration.

In 216, the map of diffractions (or 3-D image of diffractor locations) and/or other relevant data produced by the method may be stored in memory, may be displayed on a display, and/or otherwise may be analyzed to assess the formation. The collection of identified diffractors may be loaded into a 3-D visualization system so that a person may then identify areas of high diffraction and, ideally, be able to interpret their alignment in terms of geologic templates such as fault curves, horst-and-graben features, or intrusive diapirs of salt or shale. Decisions regarding where to explore (e.g. by acquiring 3-D seismic infill data or drilling an exploratory well) in the formation for hydrocarbons may be made based on analysis of the information produced in 214.

Thus various embodiments of the invention operate to perform imaging of diffractors, e.g., point scatterers of seismic energy, between the 2-D lines. Diffracted energy is truly omni-directional and arrives coherently on all nearby seismic lines, usually appearing as approximately hyperbolic "sideswipe". Such scatterers are provided by the edges of interrupted strata such as appear in structural plays such as growth faults, horst-and-graben structures, salt, shale or volcanic intrusions, and/or buried erosional channels.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer readable medium storing program instructions for analyzing seismic data, wherein the program instructions are executable by one or more processors to:

receive two-dimensional (2-D) seismic data from a formation, wherein the 2-D seismic data comprises a plurality of 2-D seismic lines, wherein at least a subset of the plurality of 2-D seismic lines have an interline spacing of 200 meters or more;

for each hypothetical diffractor location of a plurality of hypothetical diffractor locations, search at least a subset of the 2-D seismic data for coherent diffraction arrivals that are consistent with the hypothetical diffractor location, wherein the plurality of hypothetical diffractor locations correspond to the points of a three-dimensional grid that spans a volume of at least a portion of the formation; and store information regarding each of the plurality of hypothetical diffractor locations that have coherent diffraction arrivals consistent with the hypothetical diffractor location;

wherein an image is created from the stored information.

2. The memory medium of claim 1, wherein the program instructions are further executable to create a map based on the stored information, wherein the map is useable to be analyzed to assess the formation.

3. The memory medium of claim 1, wherein the image is a 3-D image, wherein the program instructions are further executable to:

display the 3-D image.

4. The memory medium of claim 1, wherein, in said search for coherent diffraction arrivals that are consistent with the hypothetical diffractor location, the program instructions are executable to select a subset of the plurality of 2-D seismic lines based on the hypothetical diffraction location and to use portions of the 2-D seismic data corresponding to said selected 2-D seismic lines for said searching.

5. The memory medium of claim 1, wherein, in said search for coherent diffraction arrivals that are consistent with the hypothetical diffractor location, the program instructions are executable to compute a measure of coherence along predicted trajectories associated with the hypothetical diffractor location.

6. The memory medium of claim 1, wherein the program instructions are further executable to preprocess the 2-D seismic data to enhance diffracted energy prior to said search for coherent diffraction arrivals that are consistent with the hypothetical diffractor location.

7. The memory medium of claim 6, wherein, in preprocessing the 2-D seismic data to enhance diffracted energy, the program instructions are executable to perform dip/velocity filtering to enhance a steep tails characteristic of diffraction arrivals.

8. The memory medium of claim 1, wherein the program instructions are further executable to:
 determine the plurality of hypothetical diffractor locations by selecting one or more points within each cell of a 3-D array of cells that spans said volume, where the selected points are used as the hypothetical diffractor locations.

9. The memory medium of claim 1, wherein the plurality of 2-D seismic lines includes first lines having a first orientation and second lines having a second orientation, wherein one or more of the first lines cross one or more of the second lines.

10. A computer-implemented method for analyzing seismic data, the method comprising:
 receiving two-dimensional (2-D) seismic data of a formation, wherein the seismic data comprises one or more 2-D seismic lines, wherein at least a subset of the 2-D seismic lines have an interline spacing of 200 meters or more;
 for each hypothetical diffractor location of a plurality of hypothetical diffractor locations, the computer searching at least a subset of the 2-D seismic data for coherent diffraction arrivals that are consistent with the hypothetical diffractor location, wherein the plurality of hypothetical diffractor locations correspond to the points of a three-dimensional grid that spans a volume of at least a portion of the formation;
 storing in a memory information regarding each of the plurality of hypothetical diffractor locations that have coherent diffraction arrivals consistent with the hypothetical diffractor location;
 creating a 3-D image based on the stored information; and
 displaying the 3-D image using a display device.

11. The method of claim 10, wherein said searching for coherent diffraction arrivals that are consistent with the hypothetical diffractor location comprises searching a subset of the 2-D seismic lines that correspond to the hypothetical diffractor location.

12. The method of claim 10, wherein said searching for coherent diffraction arrivals that are consistent with the hypothetical diffractor location comprises computing a measure of coherence along predicted trajectories associated with the hypothetical diffractor location.

13. The method of claim 10, further comprising:
 preprocessing the 2-D seismic data to enhance diffracted energy prior to said searching for coherent diffraction arrivals that are consistent with the hypothetical diffractor location.

14. The memory medium of claim 1, wherein the plurality of 2-D seismic lines are acquired using one or more sources and one or more sensors, wherein the one or more sources and the one or more sensors are located above the formation.

15. The memory medium of claim 1, wherein the plurality of 2-D seismic lines are acquired using one or more sources and one or more sensors as part of a land seismic survey, wherein each of the one or more sources is located at or near the earth surface, wherein each of the one or more sensors is located at or near the earth surface.

16. The memory medium of claim 1, wherein the plurality of 2-D seismic lines are acquired using one or more sources and one or more sensors as part of a marine seismic survey, wherein each of the one or more sources is located at, near or above the sea floor, wherein each of the one or more sensors is located at, near or above the sea floor.

17. The method of claim 10, wherein the one or more 2-D seismic lines are acquired using one or more sources and one or more sensors, wherein the one or more sources and the one or more sensors are located above the formation.

* * * * *